Feb. 5, 1929.
F. W. BAKER
1,701,470
FLEXIBLE DRIVING MECHANISM
Filed Jan. 20, 1928
3 Sheets-Sheet 1
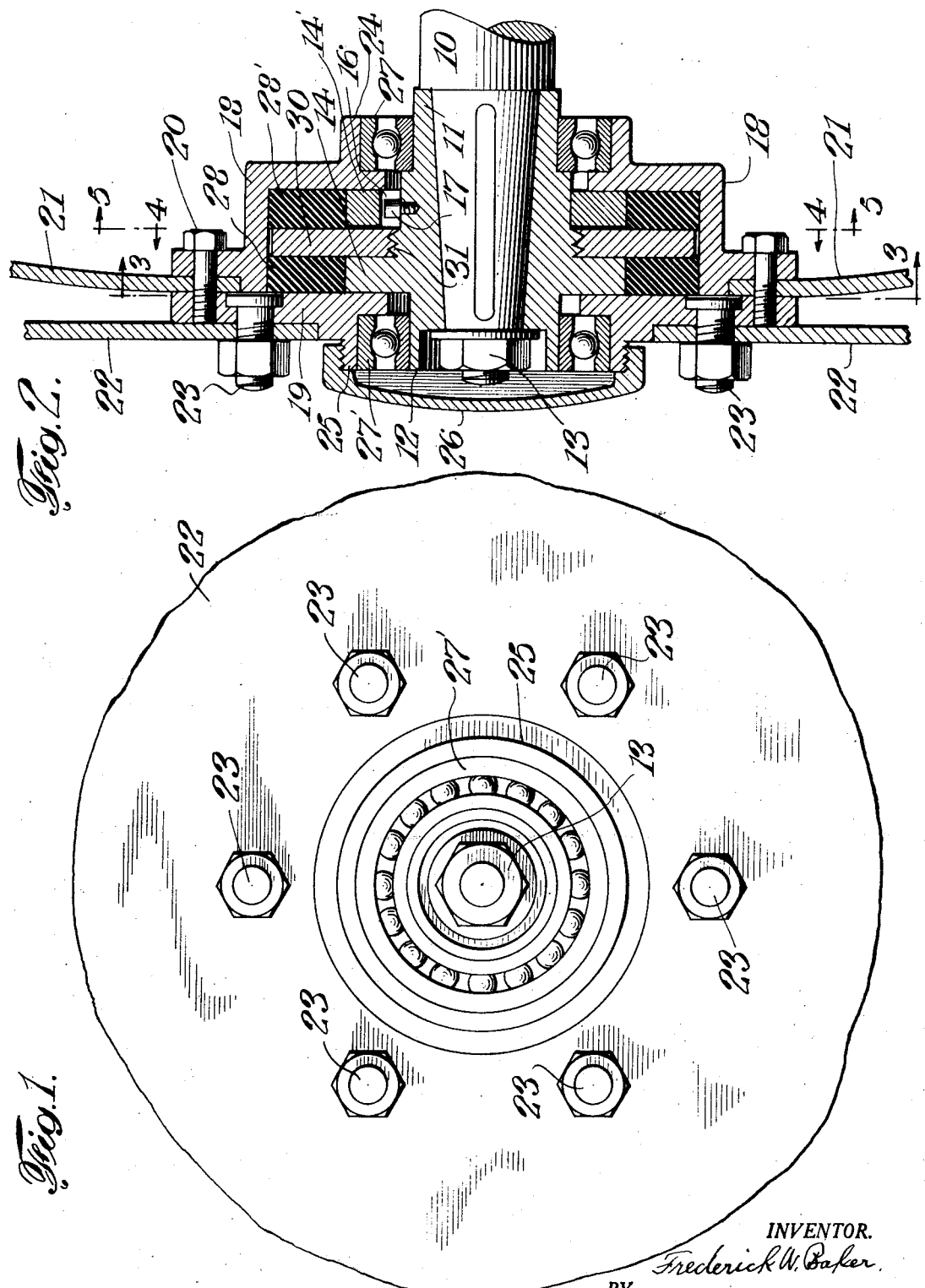
INVENTOR.
Frederick W. Baker.
BY
Hoguet & Neary
ATTORNEYS.

Feb. 5, 1929.
F. W. BAKER
1,701,470
FLEXIBLE DRIVING MECHANISM
Filed Jan. 20, 1928
3 Sheets-Sheet 2
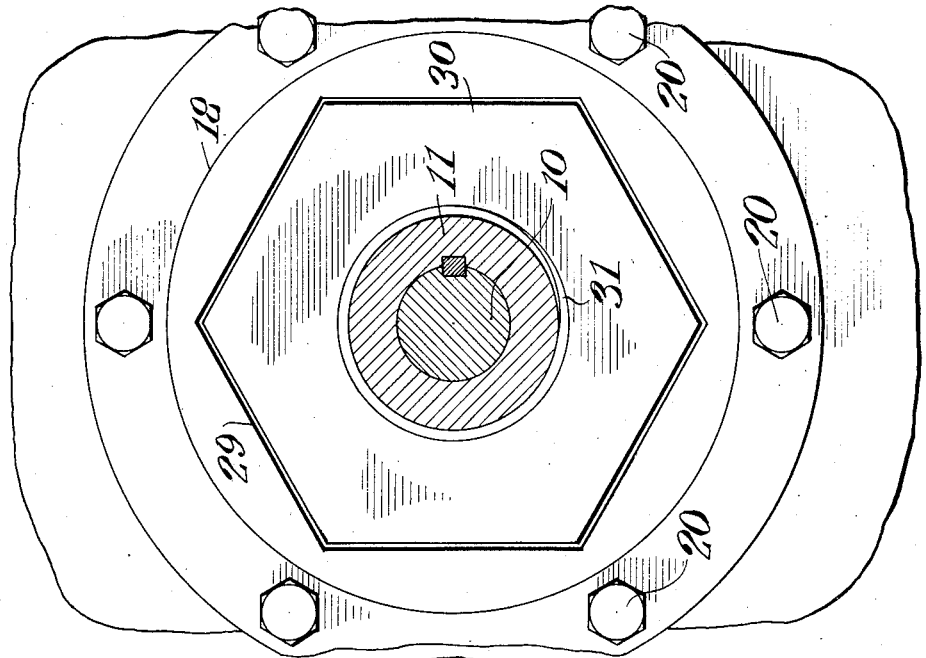
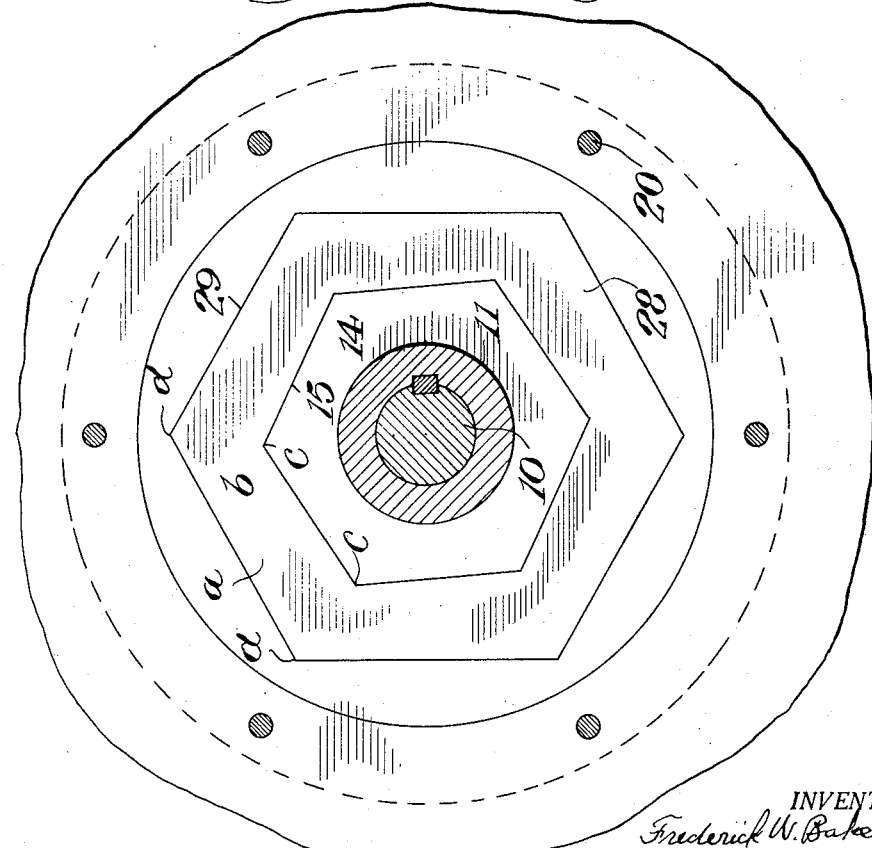
INVENTOR.
Frederick W. Baker.
BY Hoguet & Neary.
ATTORNEYS.

Feb. 5, 1929.
F. W. BAKER
1,701,470
FLEXIBLE DRIVING MECHANISM
Filed Jan. 20, 1928   3 Sheets-Sheet 3
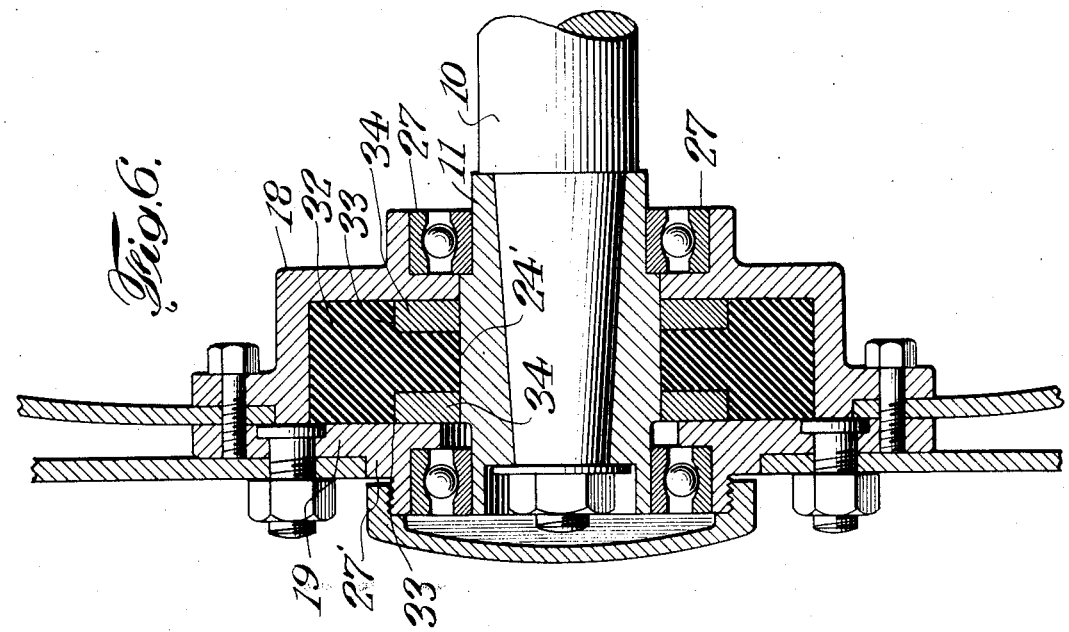
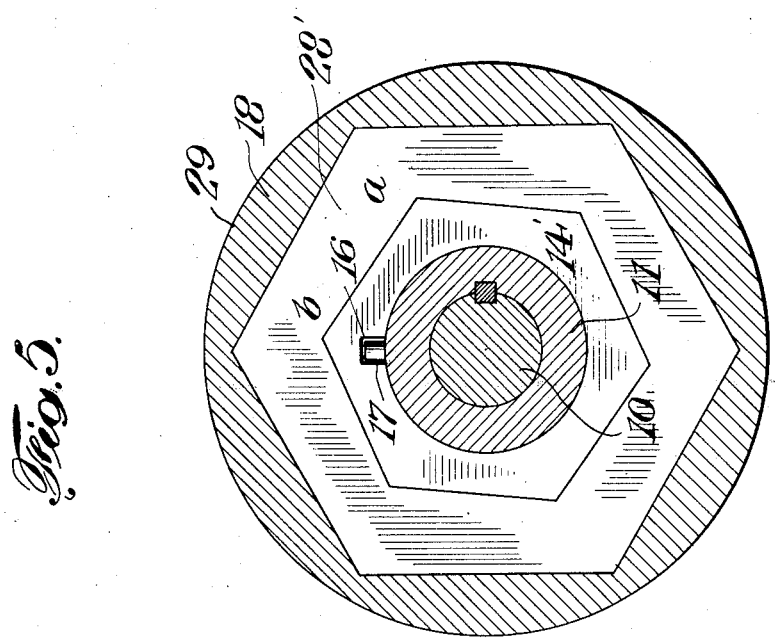
INVENTOR.
Frederick W. Baker.
BY Hoguet & Neary.
ATTORNEYS.

Patented Feb. 5, 1929.

1,701,470

UNITED STATES PATENT OFFICE.

FREDERICK WILLIAM BAKER, OF STOURBRIDGE, ENGLAND, ASSIGNOR TO TRINITY WHEEL CORPORATION, OF NEW YORK, N. Y., A CORPORATION OF NEW YORK.

FLEXIBLE DRIVING MECHANISM.

Application filed January 20, 1928. Serial No. 248,019.

My invention relates to improvements in flexible driving mechanisms by which power is transferred from the rotary driving to the rotary driven member of the type peculiarly adapted for use on motor cars. In this invention I use a rotary driving member having circumferential seats, and a rotary driven member spaced apart circumferentially from the driving member and having seats opposed to and co-acting with the seats of the driving member. The driven member has bearings on the driving member which prevent it from wobbling, and between the two members are non-metallic resilient bodies which fit snugly between the seats of the driving and driven members, and the driving strain is transmitted entirely through the resilient media. I have shown a structure analogous to this in other applications for patent, but in this case I emphasize the movable abutment plate so that if a plurality of the driving resilient bodies are used, this plate can be disposed between them so as to prevent them from cohering, and it also has an axial movement directed so that the abutment plate will move against the side of the resilient mass which is in action and prevent any lateral distortion of the mass, and furthermore confine it in such a way that the power will be transmitted with efficiency through the said mass from the driving to the driven member. In this construction I also preferably use a plurality of resilient bodies between the driving and driven members, arranged so that one body or set of bodies will be best adapted to drive in one direction, and the other body or set of bodies to drive in the opposite direction, and I dispose the abutment plate so that it will automatically move against the body which is in active use. In general the object of the invention is to produce a flexible driving mechanism which can be conveniently arranged in a self contained hub, and applied to a wheel so that when the power, especially in starting, is applied, there will be none of the usual shocks and strains incident to the starting movement.

Reference is to be had to the accompanying drawings forming a part of this specification, in which similar reference characters indicate corresponding parts in all the views.

Figure 1 is an end view of the structure embodying my invention with the hub cap removed.

Figure 2 is an axial section of the structure shown in Figure 1.

Figure 3 is a cross section on the line 3—3 of Figure 2.

Figure 4 is a cross section on the line 4—4 of Figure 2, looking in the direction of the arrow.

Figure 5 is a cross section on the line 5—5 of Figure 2 looking in the direction of the arrow, and Figure 6 is an axial section showing a slight modification of the invention.

In the drawings I have shown a driving shaft 10 which is in the form of an axle, and the invention is best adapted for connection with an axle and wheel driven thereon. To this is keyed a sleeve member 11 illustrated as being recessed at its outer end to receive a fastening nut 13 which fits on the reduced threaded end of the axle. This structure is the rather usual one, and no novelty is claimed for it. The sleeve 11 has a projecting circumferential flange 14 which is shown as hexagonal (see Figure 3), and therefore it has the flat seats or facets 15 on its face, and the member 11 also has a similar flange 14' with similar seats on its face. The member 14' is removable to facilitate assembling the parts. There can be any desired number of these parts 14 and 14' and in the drawing I have shown two. The flange 14' is illustrated as recessed at 16 to receive a set screw 17 which fastens to the member 11 and so prevents the flange 14' from turning, but any suitable means can be used for this purpose. It will be seen that the parts 10, 11, 14 and 14' constitute the essential parts of the driving member.

The driven member consists principally of the hub housing 18 and the face plate 19 which is clamped to the housing by bolts 20 or the like, and these as illustrated serve also to secure the driven member to a brake drum 21. I have shown a disc 22 as part of a disc wheel, and this is clamped to the driven member by the bolts 23 connecting with the plate 19. Obviously the parts 18 and 19 can connect in any other convenient way with a wheel and brake drum, or with a wheel alone, and with any type of wheel without affecting the invention. The driven member, for example the housing 18, is faceted internally, that is it is formed with seats 29 which correspond to and co-act with the seats 15 of the driving member.

The driven member has end flanges 24 and 25 the latter being externally screw threaded to receive a hub cap 26, and between the flanges 24 and 25 and the member 11 are bearings 27—27′, preferably ball bearings, but at any rate easy running bearings, and it will be noticed that the bearings are disposed at opposite ends of the seat parts 14—14′ so that the driven member rides easily on the driving member and the strain on the resilient driving bodies or masses 28—28′ is therefore only a driving strain, and the latter are not likely to be distorted. These resilient bodies 28—28′ can be made of rubber, rubberized material, or other resilient masses, and they fit snugly between the seats 15 of the driving member and the seats 29 of the driven member. The body 28 which is in the form of a hexagonal collar is preferably made as shown in Figure 3, with each flat section a little thicker at one end that is at the part $a$ than at the other end, to wit the part $b$, so that the apexes $c$ of the inner angles will be behind and out of radial alignment with the apexes $d$ of the outer angle. Thus, looking at Figure 3, if the driving member is turned to the right, the action will be first to twist radially slightly the central portion of the resilient body 28, and as the twisting proceeds, the motion will be gradually transmitted to the driven member, until the driving and driven members are both rotating at the same speed, at which time the points $c$ and $d$ will be in radial alignment or substantially so.

The member 28′ is exactly like the member 28, as shown in Figure 5, only it is put on in the reverse direction so that looking at Figure 5, if the driving member turns to the left, then the action on the several legs of the resilient body 28′ will be precisely as already described when the driving member is turned clockwise and the action is on the member 28.

It will be evident that there can be any desired number of these bodies 28 and 28′. Between these bodies 28 and 28′ I have shown an abutment plate 30 which is made to move axially towards the body due to the driving, and will therefore prevent any lateral distortion of the resilient body and confine it so that the strain in driving is entirely through the body and is also entirely radial and circumferential. To this end the body 30 is made to correspond externally to the shape of the driven member (see Figure 4) that is in the present case it is hexagonal, and at its inner edge it connects by screw threads 31 with the sleeve 11. Thus when the driving member is turned so as to exert its effort through the member 28, the screw thread 31 will cause the body 30 to move against the member 28 and it cannot move circumferentially with relation to the parts 11 and 18. Thus the body 28 will be confined as stated and separated entirely from the member 28′. If now the direction of rotation of the driving member is reversed, the movement of the plate or abutment 30 will consequently be reversed and the action will take place upon the member 28′. In either case the resilient driving bodies are kept separate, confined, and laterally compressed to obtain the greatest driving efficiency.

In Figure 6 I have shown a slight modification of the invention, and in this view I only illustrate one resilient body 32, but any number of such bodies might be used. This resilient mass is arranged between the driving and driven members precisely as already described, and the body is recessed at the ends as shown at 33 to receive the hexagonal collars 34 which fit in the recesses and serve to hold the mass in place and to give additional driving surface connection between the driving member and the resilient body 32. These collars 34 are hexagonal to fit the seats of the member 11, but in any event they are of such shape as to correspond with the outer surface of the driving member and with the inner abutment surface of the driven member so that they will not move relatively to the driving medium 32. It will be noticed that otherwise the structure is as already described, and that this particular driving body 32 with its reinforcing collars 34 can be arranged as already described if desired.

I claim:—

1. A flexible driving mechanism comprising a rotary driving member having circumferential seats, a rotary driven member spaced apart from and encircling the driving member, and having seats co-acting with those of the driving member, a plurality of resilient bodies interposed between the seats of the driving and driven members and disposed to take the driving strain between said members, an abutment plate between the resilient bodies, and means for moving the abutment plate in an axial direction against the resilient bodies.

2. A flexible driving mechanism comprising a rotary driving member having circumferential seats, a rotary driven member spaced apart from the driving member and having seats coacting with those of the driving member, resilient bodies filling the spaces between the driving and driven members, an abutment plate interposed between the resilient bodies, and a screw connection between the abutment plate and the driving member for moving the abutment plate endwise.

3. A flexible driving mechanism comprising a rotary driving member having circumferential seats, a rotary driven member spaced from the driving member and having seats co-acting with those of the driving member, resilient bodies interposed between the seats of the driving and driven members, an abutment plate separating the aforesaid resilient bodies and having means for preventing its rotation with relation to the driving and driven members, and means actuated by the rotation of the driving member for moving the abutment plate axially against a resilient body.

4. A flexible driving mechanism comprising a rotary driving member having circumferential seats or facets, and a rotary driven member spaced from the driving member and provided with internal seats or facets opposed to those of the driving member, resilient bodies fitting between the seats of the driving and driven members, and an abutment plate interposed between the resilient bodies having its exterior surface shaped to correspond with the opposed surface of the driven member and connected centrally by a screw thread with the driving member.

5. A flexible driving mechanism comprising a rotary driving member having circumferential seats, a rotary driven member spaced apart from the driving member and having seats co-acting with those of the driving member, a resilient body filling the space between the seats of the driving and driven members, and a collar axially movable on the driving member and engaging in the side of the resilient body, said collar being shaped to prevent its rotation with respect to the resilient body.

In testimony whereof, I have signed my name to this specification this 18th day of January, 1928.

FREDERICK WILLIAM BAKER.